US012683994B2

(12) United States Patent
Vinay et al.

(10) Patent No.: US 12,683,994 B2
(45) Date of Patent: Jul. 14, 2026

(54) DISRUPTOR VALIDATION ENGINE(S) FOR ASSESSING THE QUALITY OF DISRUPTORS

(71) Applicant: Microsoft Technology Licensing, LLC, Redmond, WA (US)

(72) Inventors: Vaishali Vinay, Cambridge (CA); Robert Lee Mccann, Snoqualmie, WA (US); Bharat Jethalal Vaghela, Morbi (IN); Davinder Kaur, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 21 days.

(21) Appl. No.: 18/812,723

(22) Filed: Aug. 22, 2024

(65) Prior Publication Data

US 2026/0058970 A1 Feb. 26, 2026

(51) Int. Cl.
*G06F 21/56* (2013.01)
*H04L 9/40* (2022.01)
*H04L 41/16* (2022.01)

(52) U.S. Cl.
CPC .......... *H04L 63/1425* (2013.01); *H04L 41/16* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 10,366,233 | B1 * | 7/2019 | Feinman | G06F 21/562 |
| 11,936,666 | B1 * | 3/2024 | Aziz | H04L 63/14 |
| 12,111,923 | B2 * | 10/2024 | Putman | G06N 3/0475 |
| 2016/0098561 | A1 * | 4/2016 | Keller | G06F 21/566 726/24 |
| 2018/0233021 | A1 * | 8/2018 | Hiebert | G06F 9/45558 |
| 2023/0281315 | A1 * | 9/2023 | Capellman | G06F 21/577 726/25 |
| 2023/0362184 | A1 * | 11/2023 | Gelman | H04L 63/1433 |

* cited by examiner

*Primary Examiner* — Christopher B Robinson

(57) ABSTRACT

Systems and methods herein provide a disruptor validation engine and its related functions. In an aspect, a disruptor validation engine may determine disruption alerts issued by one or more disruptors, where a disruption alert indicates potential malicious activity within a tenant environment. Responsive to receiving the disruption alerts, the disruptor validation engine may generate a probability grade for a respective disruption alert. The probability grade may indicate a likelihood that the potential malicious activity triggering the disruption alert is actually malicious. The disruptor validation engine may then determine a disruption classification for the disruption alert based on a respective probability grade. Based on the disruption classification, the disruptor validation engine may generate a quality grade for the one or more disruptors indicating the validity and quality of the respective disruptor.

20 Claims, 7 Drawing Sheets

| Alert Type (Generating Disrupter) | | Quality Grade | Final Verdict |
|---|---|---|---|
| Alert 123 | RiskyLogin | 90.9 | Recommended for Release |
| Alert ABC | SuspiciousInboxRule | 93.6 | Recommended for Release |
| Alert XYC | PossibleUser Compromise | 82.9 | Inconclusive (Need Manual Validation) |
| Alert 789 | SuspiciousBrowser | 94.7 | Recommended for Release |
| Alert 456 | PhishingCookieTheft | 69.4 | Inconclusive (Model Needs Improvement) |

DETERMINE A DISRUPTION ALERTS ASSOCIATED WITH ONE OR MORE DISRUPTORS — 352

GENERATE A PROBABILITY GRADE FOR EACH DISRUPTION ALERT — 354

DETERMINE A DISRUPTION CLASSIFICATION FOR EACH DISRUPTION ALERT — 356

COMPARE PROBABILITY GRADES TO THRESHOLD(S) — 358

DETERMINE DISRUPTION CLASSIFICATION BASED ON COMPARISON — 360

DETERMINE AN UNKNOWN DISRUPTION CLASSIFICATION FOR A SUBSET OF DISRUPTION ALERTS — 362

GENERATE ITERATION PROBABILITY GRADES FOR THE SUBSET OF DISRUPTION ALERTS — 364

GENERATE A QUALITY GRADE FOR THE ONE OR MORE DISRUPTORS — 366

GENERATE A DISRUPTOR SNR ESTIMATION — 368

| Generating Disruptor | Total Alert Count | Unknown Alert Count | Unknown Alert Weight % | Quality Grade | LB and UB for Quality Grade | Final Verdict |
|---|---|---|---|---|---|---|
| RiskyLogin | 275 | 51 | 10 | 90.9 | 90;92 | Recommended for Release |
| SuspiciousInboxRule | 1297 | 155 | 5 | 93.6 | 90;95 | Recommended for Release |
| PossibleUserCompromise | 45 | 12 | 20 | 82.9 | 81;85 | Inconclusive (Need Manual Validation) |
| SuspiciousBrowser | 503 | 17 | 35 | 94.7 | 92;97 | Recommended for Release |
| PhishingCookieTheft | 417 | 182 | 67 | 69.4 | 67;71 | Inconclusive (Model Needs Improvement) |

*FIG. 5*

| Probability Bin | Total Alerts Found | VDA Count | IDA Count | SNR |
|---|---|---|---|---|
| [0,0.05) | 0 | 0 | null | 0.0 |
| [0.05,0.1) | 0 | 0 | null | 0.0 |
| [0.1,0.15) | 0 | 0 | null | 0.0 |
| [0.15,0.2) | 0 | 0 | null | 0.0 |
| [0.2,0.25) | 0 | 0 | null | 0.0 |
| [0.25,0.3) | 2 | 1 | 1 | 50.0 |
| [0.3,0.35) | 5 | 2 | 3 | 40.0 |
| [0.35,0.4) | 7 | 3 | 4 | 43.0 |
| [0.4,0.45) | 2 | 0 | 2 | 0.0 |
| [0.45,0.5) | 13 | 11 | 2 | 85.0 |
| [0.5,0.55) | 14 | 12 | 2 | 86.0 |
| [0.55,0.6) | 22 | 18 | 4 | 82.0 |
| [0.6,0.65) | 40 | 22 | 18 | 55.0 |
| [0.65,0.7) | 78 | 51 | 27 | 65.0 |
| [0.7,0.75) | 74 | 53 | 21 | 72.0 |
| [0.75,0.8) | 120 | 93 | 27 | 78.0 |
| [0.8,0.85) | 163 | 134 | 29 | 82.0 |
| [0.85,0.9) | 208 | 173 | 35 | 83.0 |
| [0.9,0.95) | 280 | 242 | 38 | 86.0 |
| [0.95,1.0] | 513 | 444 | 69 | 57.0 |
| [0,1] | 1541 | 1256 | 282 | 82.0 |

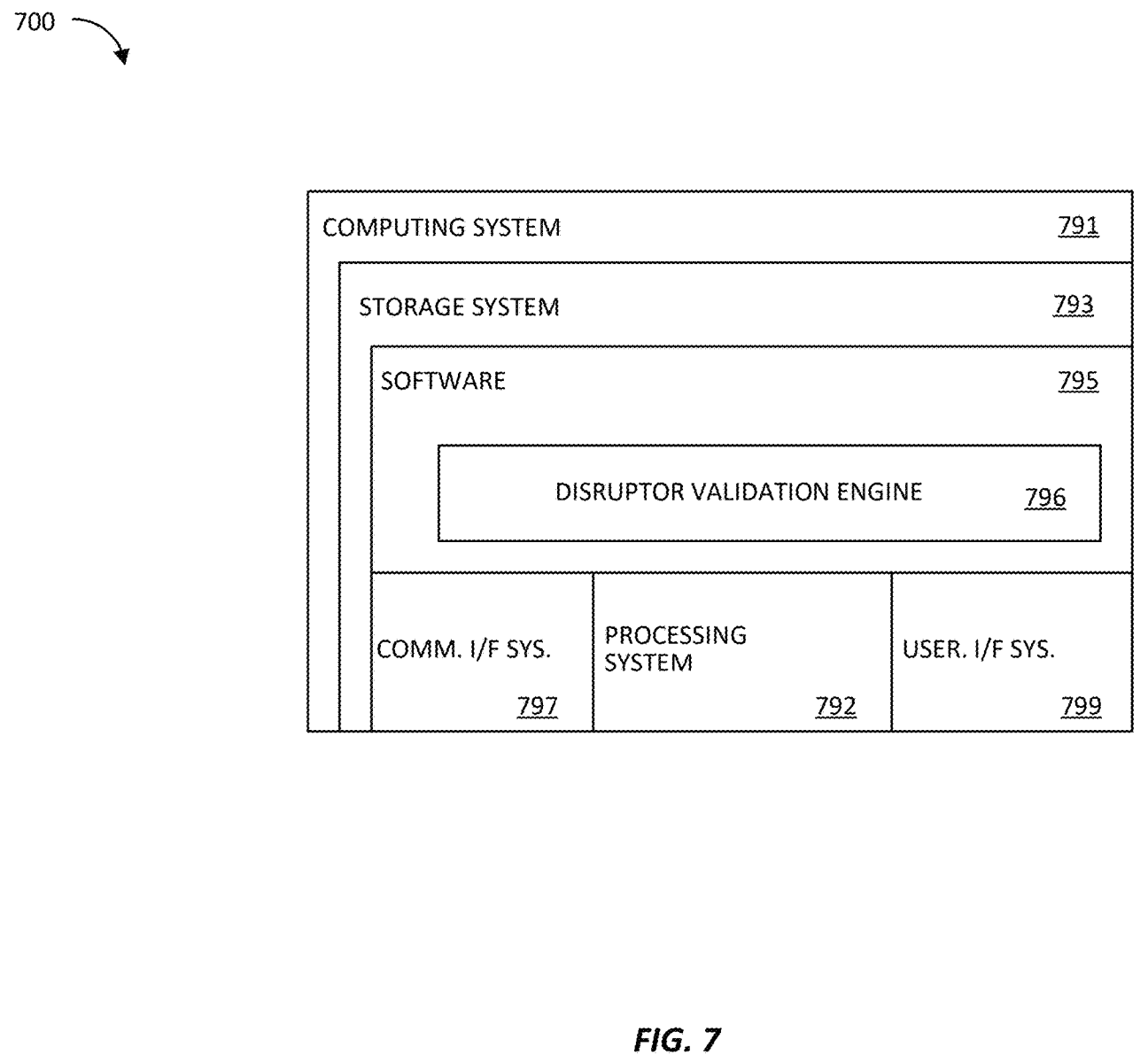

COMPUTING SYSTEM    791

STORAGE SYSTEM    793

SOFTWARE    795

DISRUPTOR VALIDATION ENGINE    796

COMM. I/F SYS.    797

PROCESSING SYSTEM    792

USER. I/F SYS.    799

FIG. 7

DISRUPTOR VALIDATION ENGINE(S) FOR ASSESSING THE QUALITY OF DISRUPTORS

TECHNICAL FIELD

Aspects of the disclosure are related to the field of computer software applications and services and, in particular, to disruptor validation engines for assessing the quality of various disruptors used to identify and disrupt malicious activity.

BACKGROUND

In the modern world, the rise of cyber threats and malicious activities has necessitated the development and implementation of advanced security solutions known as disruptors. Products like Microsoft Defender are at the forefront of this technological defense, offering real-time disruption and sophisticated threat detection capabilities. As cybercriminals become more adept at exploiting vulnerabilities, the need for robust and proactive security measures has never been greater. Disruptors not only identify and mitigate malicious activities but also provide comprehensive protection across various platforms and devices, ensuring that businesses and individuals can operate securely in an increasingly digital and interconnected environment.

SUMMARY

Technology disclosed herein includes software applications and services that provide a disruptor validation engine, and its related functions. In an aspect, a disruptor validation engine may be provided for assessing the quality and validity of a disruptor at identifying potential malicious activity within a tenant environment. To determine the quality of a disruptor, the disruptor validation engine may receive disruption alerts as issued by a respective disruptor within a tenant environment. While in pre-release stage, the disruptor may issue disruption alerts in response to detecting potential malicious activity and a successful intrusion by a threat actor. Once released, the disruptor may also take a disruption action in addition to raising alerts.

Responsive to receiving the disruption alerts, the disruptor validation engine may generate a probability grade for a disruption alert. The probability grade may indicate a likelihood that the potential malicious activity is truly malicious and an active cyber-attack has been found until a disruption action is taken. As will be described in greater detail below, the probability grades may be generated by a machine learning (ML) model and trained to predict whether a disruption alert is a valid disruption alert, or an invalid disruption alert based on alert features or metadata and historical alert actions.

Based on the probability grades, the disruptor validation engine may classify a disruption alert into a respective disruption classification. For example, disruption alerts identified as valid disruption alerts as indicated by respective probability grades may be classified into a valid disruption classification, disruption alerts identified as invalid disruption alerts as indicated by respective probability grades may be classified into an invalid disruption classification, and disruption alerts that cannot be identified as a valid or invalid disruption alert with a high confidence (e.g., 90%) may be classified into an unknown alert classification. Based on the classifications, the disruptor validation engine may generate a quality grade for the disruptor, as described in greater detail below. Using the quality grade, the disruptor validation engine may calculate an SNR estimate of the respective disruptor and/or generate a verdict on whether the respective disruptor is ready for release or should be further refined or reviewed by human graders.

This Summary is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure may be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 3 illustrates a process for providing a disruptor validation engine and its related functions, according to an embodiment herein;

FIG. 5 illustrates example verdict report generated by a disruptor validation engine, according to an embodiment herein;

FIG. 6 illustrates an example table for providing a probability bin distribution used to select thresholds for a respective model, according to an embodiment herein; and FIG. 7 shows an example client device suitable for providing a disruptor validation engine and related functions, according to an embodiment herein.

DETAILED DESCRIPTION

Figure 1:
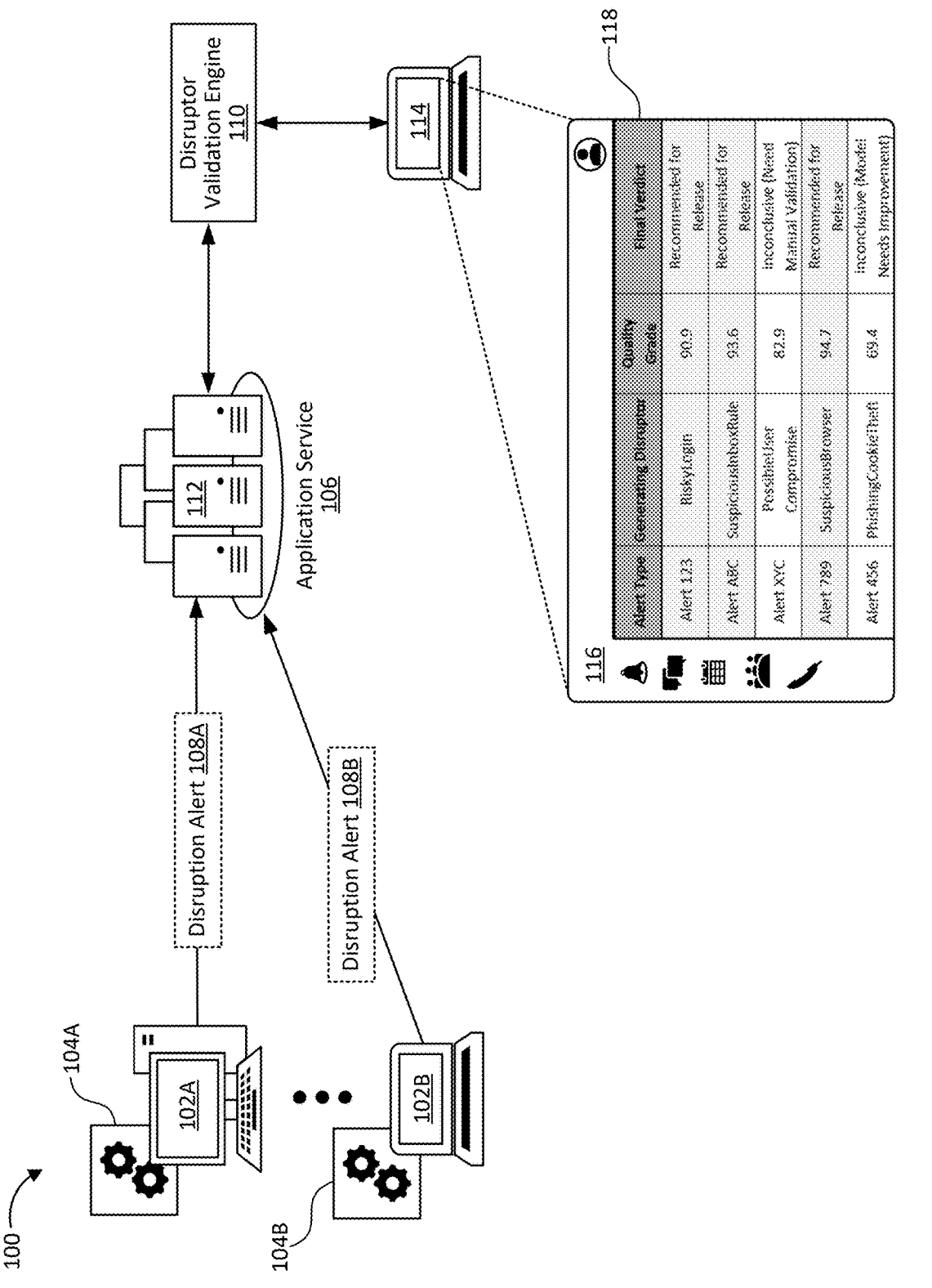
FIG. 1 illustrates an operational environment for providing a disruptor validation engine, according to an embodiment herein.

Disruption systems are sophisticated security solutions designed to detect and contain cyber-attacks or malicious activities in real-time, and, in some cases, automatically. At the core of these systems are disruptors, which might contain research heuristic rules, advanced algorithms and machine learning (ML) models that continuously monitor and analyze data within an environment to identify potential threats. When a disruptor detects an anomaly that indicates a possible security breach or malicious activity, the disruptor generates alerts and may trigger automatic responses to mitigate the threat. These responses can include isolating affected systems, blocking malicious traffic, and notifying security personnel. The primary goal of disruption systems is to minimize the impact of cyber threats and malicious activity by rapidly identifying and containing them before they can cause significant harm.

To assess the severity and credibility of a threat, disruptors like Microsoft Defender often cross-reference detected potential malicious activity with a vast database of known threats and indicators of compromise. Upon confirmation of high confidence, disruptors generate real-time disruption alerts and take real-time disruption actions, providing detailed information about the threat and recommended actions to remediate it. These alerts enable security teams to respond swiftly and effectively, minimizing potential damage and fortifying the tenant environment against on-going and/or future attacks.

As cyber-attacks and malicious activity continue to morph and expand, security teams often seek to develop and release new disruptors to address the new malicious activity. Development and release of new disruptors, however, often faces significant challenges, particularly in ensuring the accuracy of the disruption alerts. For example, a major hurdle lies in a disruptors ability to distinguish between valid disruptions (e.g., true positives), where an alert accurately identifies a real threat and the presence of a threat actor in tenant environment, from invalid disruptions (e.g., false positives), where either legitimate activities are mistakenly flagged as malicious, or a true malicious activity has occurred, but the threat actor was unable to compromise tenant environment. This difficulty arises from the sophisticated and ever-changing tactics of cyber threats, which often mimic legitimate behaviors to evade detection. Moreover, the sheer volume of data and the diverse range of activities within a tenant environment add to the complexity.

Because many disruptors take actions automatically, a disruptor's accuracy in distinguishing valid alerts (e.g., true positives) from invalid ones (e.g., false positives) is vital. The consequences of inaccurate alerts can be significant, as false positives can lead to unnecessary disruptions in operations, while false negatives can leave systems vulnerable to undetected threats. Accordingly, conventional approaches to developing and deploying disruptors often rely heavily on manual processes to ensure this accuracy. Expert analysts meticulously review and validate the alerts generated by disruptors to refine detection algorithms and improve their precision. This process, however, is labor-intensive and time-consuming, requiring substantial resources and skilled personnel. Additionally, the reliance on human judgment might introduce the potential for errors and inconsistencies, which can undermine the reliability of the disruption system. For example, the repetitive nature of this task can cause analyst fatigue, increasing the likelihood of mistakes and the risk of critical threats being overlooked. Moreover, the manual assessment of alerts can lead to delays in responding to genuine threats, reducing the overall effectiveness of the security measures.

To address at least these shortcomings of conventional approaches, an example disruptor validation engine is provided herein for assessing and validating the quality and accuracy of a disruptor before and after deployment. As will be expanded on in greater detail below, the example disruptor validation engine may receive disruption alerts from various tenant environments in which one or more disruptors are running. The disruption alerts may be issued when a respective disruptor detects potential malicious activity or a potential threat. Once received, the disruptor validation engine may generate a probability grade for one or more disruption alerts. The probability grade may indicate a likelihood that a respective disruption alert corresponds to a valid disruption. Based on the probability grades, the disruptor validation engine may then determine whether a disruption alert is a valid disruption, an invalid disruption, or an unknown. To enhance the accuracy of the disruptor validation engine's classification of a disruption alert, then disruptor validation engine may be trained on datasets gathered both before and after the disruption alert was generated, thereby providing "true" datapoints from which the disruptor validation engine's analysis may be anchored. Based on the training, the disruptor validation engine may efficiently identify some of the disruption alerts with high confidence that are valid and invalid. The remaining disruption alerts may be classified as unknown alerts.

For unknown alerts, the disruptor validation engine may perform a variety of subsequent analyses to determine a range of probabilities that an unknown alert is a valid alert or an invalid alert. For example, the disruptor validation engine may submit the unknown alerts to multiple ML models, which in turn may generate a probability grade for each of the unknown alerts. Since each ML model may generate its own probability grade for an unknown alert, the disruptor validation engine may determine a probability grade range for a respective disruption alert.

Based on the analysis of the disruption alerts, the disruptor validation engine may determine a quality grade for each disruptor analyzed. To determine a quality grade for a respective disruptor, the disruptor validation engine may generate a disruptor signal-to-noise ratio (SNR) estimation. As can be appreciated, a higher SNR estimation may indicate that the disruptor validation engine's analysis of the disruption alerts for a respective disruptor is strong and distinct from any underlying noise, thereby suggesting a reliable analysis. Conversely, a lower SNR estimation may indicate that the disruptor validation engine's analysis is affected by noise and may include potential inaccuracies. Accordingly, the disruptor validation engine may generate a quality grade for each disruptor to identify disruptors that may require additional analysis or human input before being validated. Based on the quality grade, the disruptor validation engine may generate a verdict for each of the disruptors, indicating whether the disruptor is ready for deployment or further analysis/review is required.

As will be described in greater detail below, the disruptor validation engine allows for assessment and validation of a disruptor with minimal manual input. By effectively identifying and classifying a large portion of disruption alerts with high confidence, the disruptor validation engine minimizes the validation workload of security threat researchers, data science, and human graders, thereby allowing for resources to be reallocated and focused on more complex and ambiguous cases. Additionally, the automation of the validation process provided by the disruptor validation engine reduces the risk of human error, leading to more consistent and reliable threat detection. As can be appreciated, having an accurately validated disruptor brings substantial benefits, including improved detection accuracy, which ensures that genuine threats are identified and addressed swiftly while minimizing false positives. This reliability fosters greater confidence in the security system, enhancing overall protection and enabling a more proactive and responsive defense against cyber threats and malicious activity.

Turning now to FIG. 1, FIG. 1 illustrates an operational environment 100 for providing a disruptor validation engine 110, according to an embodiment herein. In particular, the operational environment 100 illustrates client devices 102A and 102B having one or more disruptors 104A and 104B, respectively, executing thereon. The disruptors 104A- and 104B may continuously monitor for security threats and malicious activity on the tenant environments associated with the client devices 102A-B. For example, the disruptors 104A-B may be integrated within each system's operating environment and analyze real-time data flows and system behaviors for anomalies that may indicate potential malicious activity. The disruptors 104A-B may scrutinize various indicators, such as unusual network traffic, unauthorized access attempts, and suspicious file modifications, to identify and assess risks. By running directly on the client devices 102A-B, the disruptors 104A-B may provide immediate, localized responses to detected threats, such as isolating compromised elements, blocking malicious processes, and alerting security teams.

It should be appreciated that while the disruptors 104A-B are illustrated and discussed in the singular, each client device 102A-B may have multiple disruptors 104A-B running concurrently. Having multiple disruptors 104A-B executing within the same tenant environment can provide comprehensive protection by covering a broader spectrum of potential threats. For instance, one disruptor might specialize in detecting malware, while another disruptor focuses on identifying network intrusions. This layered disruption approach may ensure that threats are swiftly contained, reducing the risk of widespread impact and enhancing the overall security posture of the clients device 102A-B and the broader network to which the client devices 102A-B connect.

As shown, the client devices 102A-B may be in operational communication with an application service 106 for one or more functions or features. Broadly speaking, the application service 106 provides software application services to end points, such as the client devices 102A-B, examples of which include security software for detecting and disrupting cyber threats and malicious activity. In the illustrated example, the application service 106 may provide a security system that develops and deploys the disruptors 104A-B. As such, the client devices 102A-B may load and execute software applications locally that interface with services and resources provided by the application service 106, such as the disruptors 104A-B. The applications may be natively installed and executed applications, web-based applications that execute in the context of a local browser application, mobile applications, streaming applications, or any other suitable type of application. Example services and resources provided by the application service 106 include front-end servers, application servers, content storage services, authorization and authentication services, and the like.

To interact with the application service 106, the client devices 102 may communicate with the application service 106 via one or more internets and intranets, the Internet, wired and wireless networks, local area networks (LANs), wide area networks (WANs), or any other type of network or combination thereof. Examples of the client devices 102A-B may include personal computers, tablet computers, mobile phones, gaming consoles, wearable devices, Internet of Things (IoT) devices, and any other suitable devices, of which computing apparatus 791 in FIG. 7 is also broadly representative.

In the illustrated example, the application service 106 operates in a cloud-based environment. As such, the application service 106 employs one or more server computers 112 co-located with respect to each other or distributed across one or more data centers to deliver its functionalities and services. Example servers include web servers, application servers, virtual or physical servers, or any combination or variation thereof, of which computing apparatus 791 in FIG. 7 is broadly representative.

As illustrated, the application service 106 may include an integration with the disruptor validation engine 110 to assess the quality and accuracy of the disruptors 104A-B, as described herein. In some embodiments, the disruptor validation engine 110 may be executed remotely by the application service 106 or a third party, while in other embodiments the disruptor validation engine 110 may be installed and executed locally on the client devices 102A-B. In still other embodiments, one or more functions of the disruptor validation engine 110, as described herein, may be installed and executed locally on the client devices 102A-B, while the remaining functions are integrated and executed remotely via the application service 106 or a third party.

When the disruptors 104A-B detect potential malicious activity, the disruptors 104A-B may issue disruption alerts 108A-B, respectively. As will be described in greater detail below with respect to FIGS. 2-3, the disruption alerts 108A-B may include alerts corresponding to detected malicious activity in which a disruption action is taken and alerts corresponding to detected malicious activity in which no disruption action is taken. For example, if the disruptor 104A is a released disruptor, meaning it is fully deployed by the application service 106, then the disruptor 104A may take a disruption action when the malicious activity is detected in addition to generating the disruption alert 108A. In contrast, the disruptor 104B may be in development and as such may not yet be released. However, to assess whether the disruptor 104B is ready for release, the disruptor 104B may run silently on the client devices 102A-B and may issue the disruption alert 108B when malicious activity is detected but take no disruption action. As noted above, disruption actions may include isolating compromised elements or systems, blocking malicious processes, quarantining infected files, terminating suspicious connections, disabling affected user accounts, and the like.

Once issued, the disruption alerts 108A-B may be collected by the application service 106. The application service 106 may collect the disruption alerts 108A-B to provide a centralized and comprehensive view of the security landscape of the monitored environment (e.g., the tenant environments of the client devices 102A-B). Collecting the disruption alerts 108A-B enables security teams to quickly identify patterns and trends in malicious activity, facilitating more effective threat analysis and response strategies. By aggregating the alerts 108A-B from multiple disruptors 104A-B, the application service 106 can correlate data points to distinguish between isolated incidents and coordinated attacks, enhancing the accuracy and efficiency of threat detection. Moreover, the disruption alerts 108A-B may serve as critical documentation for compliance and auditing purposes, demonstrating that proactive measures are in place to protect sensitive data and systems.

Responsive to receiving the disruption alerts 108A-B, the application service 106 may provide the disruption alerts 108A-B to the disruptor validation engine 110. As will be described in greater detail with respect to FIGS. 2-5 below, the disruptor validation engine 110 may generate a probability grade for a disruption alert 108A-B indicating the likelihood that a respective disruption alert is a valid disruption alert or an invalid disruption alert. As used herein, a valid disruption alert may be a disruption alert that corresponds to actual or simulated malicious activity (e.g., security testing). As such, valid disruption alerts may contain true positives in the case that actual malicious activity was present in the tenant environment and benign positives, in the case where security testing mimicked malicious activity within the tenant environment. In contrast, an invalid disruption alert may be a disruption alert that was issued despite no underlying malicious activity and may be referred to herein as a false positive.

Based on the probability grades, the disruptor validation engine 110 may classify a disruption alert 108A-B into a valid classification, an invalid classification, and an unknown classification. The valid classification may be for disruption alerts 108A-B that the disruptor validation engine 110 determines to be valid disruption alerts with high confidence (e.g., 90+% confidence) and the invalid classification may be for disruption alerts 108A-B that the disruptor validation engine 110 determines to be invalid disruption alerts with high confidence. Any disruption alerts 108A-B that the disruptor validation engine 110 does not identify as either valid or invalid, the disruptor validation engine 110 may classify these remaining disruption alerts 108A-B into an unknown classification. In other words, the remaining disruption alerts 108A-B, also referred to herein as "unknown alerts," are disruption alerts that the disruptor validation engine 110 cannot identify as either valid or invalid with high confidence. As will be described in greater detail below, the disruptor validation engine 110 may perform a variety of additional analyses on the unknown alerts (in a fully automated manner or with limited human validation, depending on the scenario) to determine one or more additional probability grades indicating the likelihood that each unknown alert corresponds to a valid disruption.

Using the analysis of the disruption alerts 108A-B, the disruptor validation engine 110 may generate a report 118 of its assessment of the disruptors 104A-B. The report 118 may include a quality grade for each of the disruptors 104A-B, and in some cases a final verdict as to whether the disruptor 104A-B is recommended for release or needs further improvement. While discussion herein focuses on the disruptor validation engine 110 assessing the disruptors 104A-B for release, the disruptor validation engine 110 may also assess whether already released disruptors 104A-B are performing with desired precision and accuracy within the current cyber threat landscape.

As illustrated, the report 118 may be provided to a user of a client device 114 via a user interface 116 of an application executing on the client device 114. The application may correspond to the application service 106 or with an application associated with the disruptor validation engine 110. For example, the client device 114 may correspond to a disruption project manager or a disruptor development team member who is reviewing and assessing the readiness of the disruptors 104A-B for release. As such, the user of the client device 114 may interact with the disruptor validation engine 110, such as to modify one or more ML models employed by the disruptor validation engine 110 and/or the disruptors 104A-B, as described below. Based on the report 118, the client device 114 may indicate that one or more of the disruptors 104A-B is ready for deployment, thereby ensuring that the necessary security measures are in place to monitor and protect against potential threats and malicious activity effectively and immediately.

Figure 2:
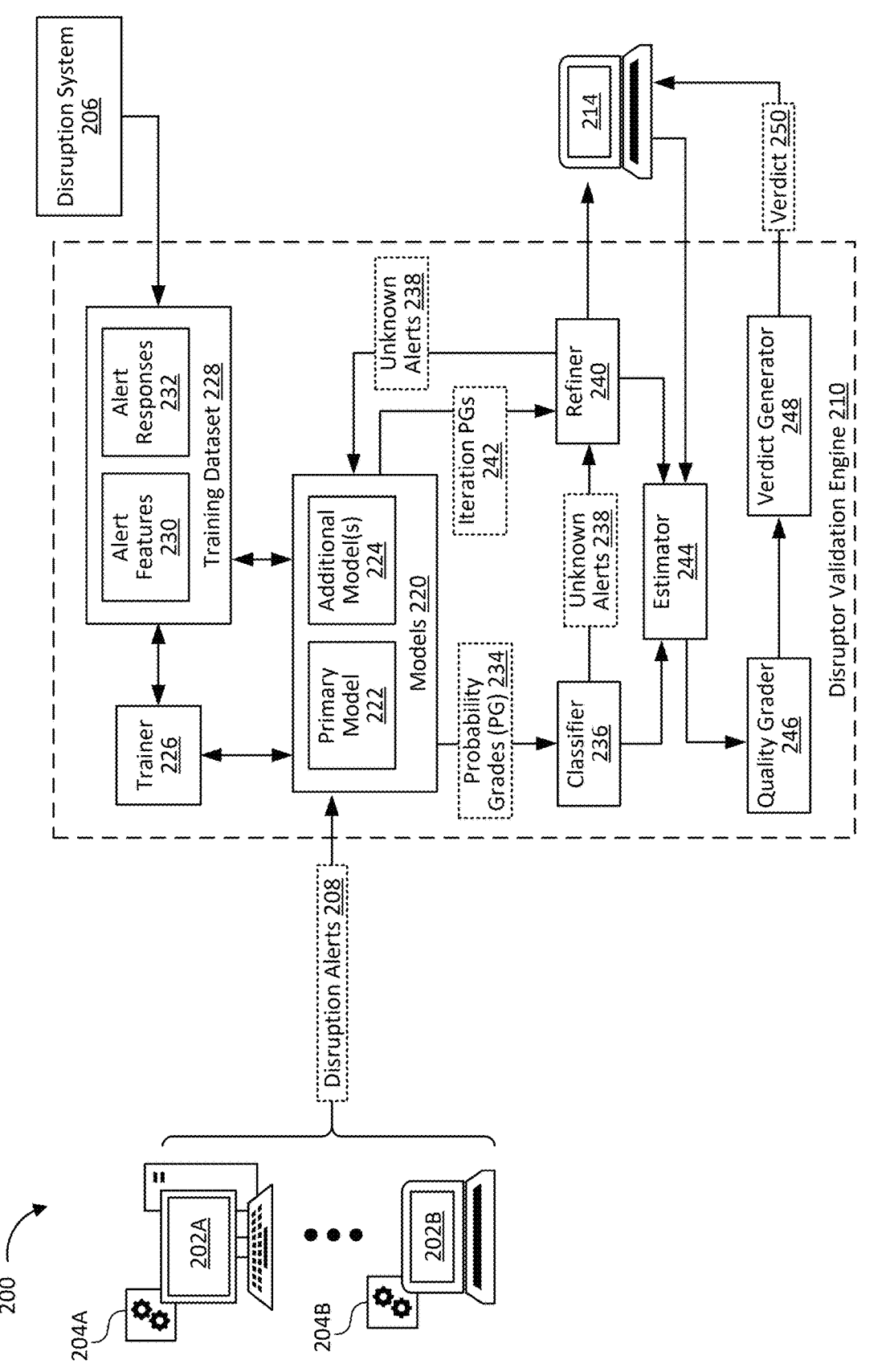
FIG. 2 illustrates an example operational system in which a disruptor validation engine is provided, according to an embodiment provided herein.
Figure 4:
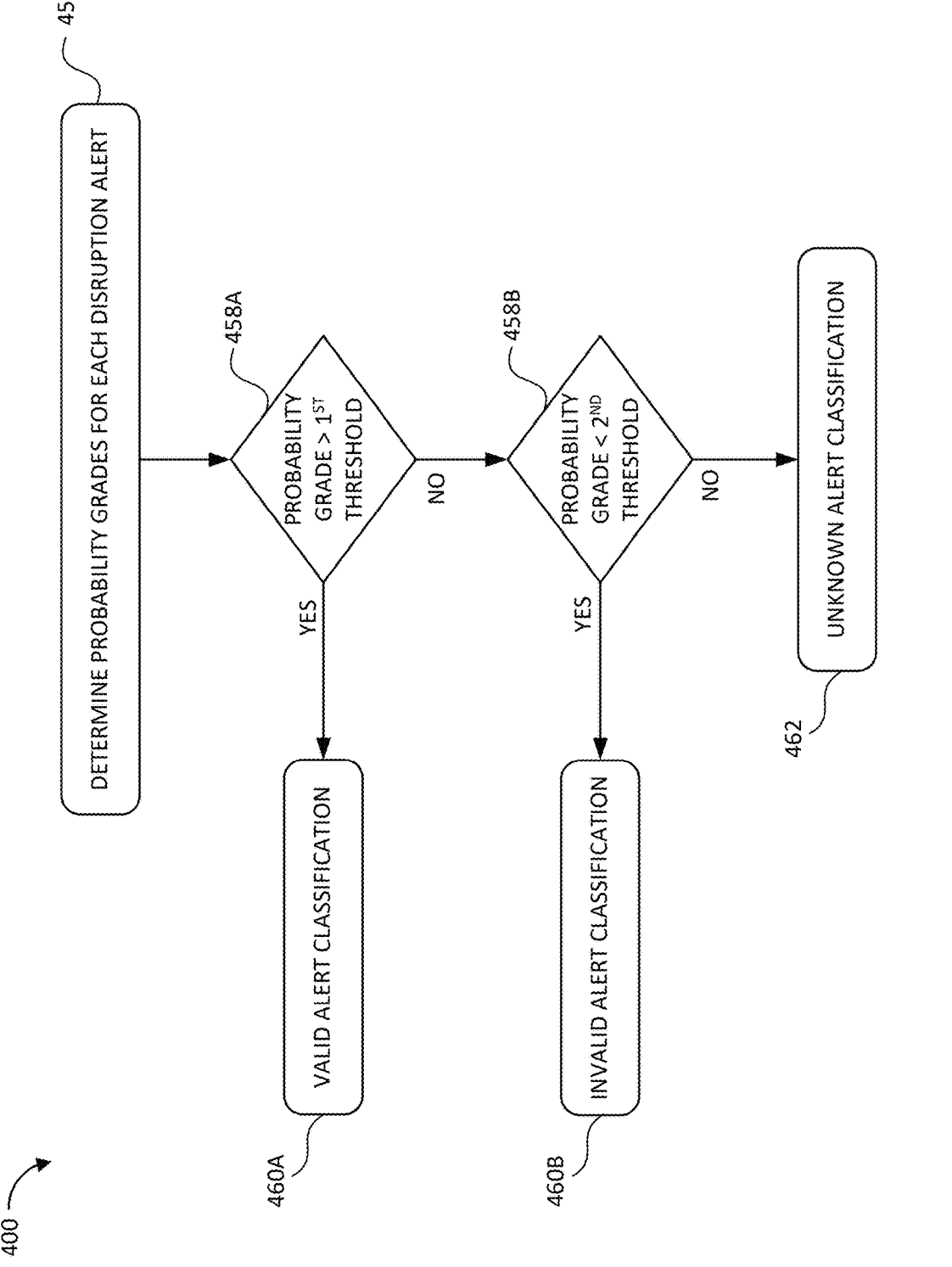
FIG. 4 illustrates a process for classifying disruption alerts, according to an embodiment herein.

Referring now to FIG. 2, an example operational system 200 in which a disruptor validation engine 210 is provided, according to an embodiment herein. For ease of illustration, FIG. 2 is described with respect to FIG. 3, which provides a process 300 for providing a disruptor validation engine and its related functions, and FIG. 4, which provides a process 400 for classifying disruption alerts, according to various embodiments herein. Although FIGS. 3 and 4 are described in relation to FIG. 2, it should be appreciated that the processes 300 and 400 of FIGS. 3 and 4, respectively, are equally applicable to the remaining Figures and components therein.

As shown, the system 200 includes a disruptor validation engine 210 in operable communication with the client devices 202A-B, which may be the same or similar to the client devices 102A-B, respectively. For example, the disruptor validation engine 210 may be provided by an application executing on the client devices 202A-B, such as an application associated with the application service 106 or may be provided by a system provided by the application service 106, such as a disruption system 206. In some embodiments, the disruptor validation engine 210 may be executed remotely from the client devices 202A-B, such as by a cloud-based application service or third party, while in other embodiments, the disruptor validation engine 210 may be executed locally at the client devices 202A-B.

One or more disruptors 204A-B may be executed and running on the client devices 202A-B. The disruptors 204A-B may be the same or similar to the disruptors 104A-B, such as by being representative of multiple disruptors executing concurrently within a respective tenant environment. In some embodiments, the disruptors 204A-B may be developed and deployed by the disruption system 206 for monitoring and preventing of malicious activity within the tenant environments of the client devices 202A-B. As such, when potential malicious activity is detected, the disruptors 104A-B may issue disruption alerts 208, which may be the same or similar to the disruption alerts 108A-B. As noted above, the disruption alerts 208 may include disruptions (e.g., events in which malicious activity is detected) in which a disruption action is taken and/or disruptions in which no disruption action is taken. Additionally, it should be appreciated that while the disruption alerts 208 are illustrated as issuing from two client devices 102A-B, in real-world scenarios, the disruption alerts 208 may be issued from dozens, if not hundreds or thousands of client devices. As such, the disruption alerts 208 may contain hundreds, thousands, or hundred-thousands of disruption alerts.

In some embodiments, the process 300 may begin with the disruptor validation engine 210 determining the disruption alerts 208 associated with the disruptors 204A-B (352). For example, the client devices 202A-B may issue the disruption alerts 208 associated with the disruptors 104A-B directly to the disruptor validation engine 210, while in other embodiments, the disruptor validation engine 210 may receive the disruption alerts 208 from the disruption system 206. For example, the disruption system 206 may identify the disruptors 204A-B for assessment and/or validation and route the disruption alerts 208 to the disruptor validation engine 210 for analysis.

Responsive to receiving the disruption alerts 208, the disruptor validation engine 210 may generate a probability grade 234 for a disruption alert 208 (354). To generate the probability grades 234 for the disruption alerts 208, the disruptor validation engine 210 may include one or more models 220. The models 220 may include one or more of a machine learning (ML) model, a prediction model, a neural network, or other computational algorithms designed to analyze data, make predictions, and uncover patterns or correlations within complex datasets.

As illustrated, the models 220 may include a primary model 222 and one or more additional models 224. The disruptor validation engine 210 may include a trainer 226 that trains each of the models 220 on a training dataset 228. In an illustrative example, the primary model 222 may be a Light Gradient Boosting Machine (GBM) model that the trainer 226 hyper-tunes using a 3-fold cross-validation (CV) technique based on the training dataset 228. In other examples, one or more of the models 220 may be or include a machine-learning (ML) model or an artificial intelligence (AI) algorithm, such as Random Forests, XGBoost (Extreme Gradient Boosting), AdaBoost (Adaptive Boosting), and CatBoost (Categorical Boosting) models.

The training dataset 228 may include various datapoints and metadata relating to a historical disruption alerts. As shown, the training dataset 228 may include alert features 230 and alert responses 232. The alert features 230 may include datapoints and/or metadata corresponding to pre-disruption and post-disruption events for respective histori-cal datapoints. For example, the datapoints may include activity and states gathered up to a predefined pre-duration, such as 24 hours, before a disruption alert was issued and activity and stats gathered up to a predefined post-duration, such as 6 hours, after the disruption alert was issued. In some embodiments, the trainer 226 may data-mine historical disruption alerts and related metadata to determine the alert features 230. Table 1 provided below illustrates example alert features 230 that may be used as part of the training dataset 228 by the trainer 226.

TABLE 1

| | Pre-Disruption Signal (Alert Time − x days to Alert Time) | Post-Disruption Signal (Alert Time to Alert Time + 6 h) |
|---|---|---|
| Alert Metadata | Category | — |
| | Product | — |
| | Mitre Attack Technique | — |
| Threat Intelligence (TI) Indicators | Verify TI indicators on IP, URL, Domain, Email Address, Sha256 | |
| Incident Stats | Alert Count, Alerted User Count, Device Count, Receiver Mailbox Address Count, Sender Address Count, Application Count, Count of Emails Received from Outside Network | |
| User Stats | Distinct Alert Product Count from where Alerts are raised on user | |
| Device/ Application Stats | Total Number of Alerts and # of Alerts per Severity Raised on Devices/Application | |
| Cross-Tenant Stats for each Evidence Entity | Distinct Tenant Count High Severity Alert Count Low Severity Alert Count Informational Severity Alert Count Medium Severity Alert Count | |
| Tenant Stats | Alert Count seen in tenant environment, #of alerts (severity wise) from each of the alerted evidence entity from disrupted alerts | |

In addition to alert features 230, the training dataset 228 may include alert responses 232. The alert responses 232 may include user feedback on respective historical disrup-tion alerts and an indication of whether any actions were taken on behalf of the user with respect to the disruption alert. For example, the alert responses 232 may include user feedback on a respective historical disruption alert, such as the user indicating that malicious activity was detected or that security testing was being performed. The alert responses 232 may also include an indication on whether any remediation actions were taken responsive to a respec-tive historical disruption alert. For example, the alert responses 232 may indicate that a user changed his or her password, a client device was isolated, or whether the user continued activity as normal.

In some embodiments, the alert responses 232 may be used for labeling during the training process, and as features during the validation process. Labeling may be useful during the training process to anchor one or more of the models 220 by associating the input data (e.g., the historical disruption alerts) with corresponding output categories (e.g., valid disruption alerts or invalid alerts). Within the training dataset 228, the trainer 226 may assign or otherwise associate each historical disruption alert with corresponding alert responses 232 so that the model can recognize patterns and make predictions based on the known associations.

Using the alert features 230 and the alert responses 232, which may be in the form of labels, the trainer 226 may train one or more of the models 220 to generate a probability grade for each of the new disruption alerts, such as the disruption alerts 208. As will be described in greater detail below with respect to classifying the disruption alerts 208, the trainer 226 may take additional steps to tune various parameters of the models 220 such that the resulting model generates probability grades with a high confidence (e.g., 95%) and accuracy.

As noted above, the probability grades 234 may be generated by one or more of the models 220 responsive to receiving the disruption alerts 208. In some embodiments, the primary model 222 may generate the probability grades 234. The probability grades 234 may be or include a probability that a disruption alert 208 corresponds to a valid disruption. That is, for a disruption alert 208 received from the client devices 202A-B, the primary model 222 may generate a probability grade indicating the likelihood or probability that the respective disruption alert corresponds to a valid disruption. In other words, the probability grades 234 may indicate the confidence level of the primary model 222 that the disruption alert 208 is for a valid disruption.

Once generated, the disruptor validation engine 210 may determine a disruption classification for one or of the disruption alert(s) 208 based on the probability grades 234 (356). For example, the disruptor validation engine 210 may include a classifier 236 that determines a disruption classi-fication for the disruption alert 208. To determine a disrup-tion classification, the classifier 236 may compare each of the probability grades 234 to one or more thresholds (358). Then, based on the comparison, the classifier 236 may determine a disruption classification for the disruption alert (360).

With reference to FIG. 4, the example process 400 illus-trates how the classifier 236 may compare the probability grades 234 to one or more thresholds to classify the disrup-tion alerts into one or more disruption classifications. As shown, once the probability grades 234 are determined for the disruption alert 208, the probability grades 234 may be compared to a first threshold (458A). The first threshold may be a pre-defined limit or probability grade threshold, which may be generated during the model training process, beyond which the disruptor validation engine 210 considers a respective disruption alert 208 to be a valid disruption based on the respective probability grades 234 indicating a high confidence of a valid disruption. That is, if a probability grade 234 is above the first threshold, then the classifier 236 may determine the respective disruption alert 208 to be a valid disruption, and thus classify the disruption alert 208 into a valid alert classification (460A). As can be appreci-ated, the first threshold might define a specific probability grade, such as 90% or higher, that indicates any disruption alert 208 exceeding it contains conditions (e.g., alert fea-tures) that have been observed and validated enough times to establish a strong correlation with a valid disruption. As will be described in greater detail below, the first threshold may be greater than 85%, greater than 90%, or greater than 95% and may vary depending on tuning of the primary model 222.

If one or more of the probability grades 234 are not greater than the first threshold, then the subset of probability grades 234 falling below the first threshold may be compared to a second threshold (458B). Specifically, the classifier 236 may determine whether the subset of probability grades 234 that fall below the first threshold are less than the second threshold or greater than the second threshold. If one or more of the subset of probability grades 234 are less than the second threshold, then the respective disruption alerts 208 may be classified into an invalid alert classification (460B). The second threshold may define a specific probability grade, such as 25% or lower, that indicates any disruption alert 208 failing to meet it contains conditions (e.g., alert features) that have been observed and validated enough times to establish a strong correlation with an invalid disruption.

For the remaining disruption alerts 208 having probability grades 234 that do not fall below the second threshold and do not exceed the first threshold, the classifier 236 may classify these disruption alerts 208 into an unknown alert classification (462). These disruption alerts 208 may be referred to as unknown alerts 238. Unknown alerts 238 may be a subset of the disruption alerts 208 having probability grades 234 that the model 220 cannot identify as either valid or invalid with a high confidence (e.g., 90%). It should be appreciated that while process 400 illustrates the probability grades 234 being compared to the first and second threshold sequentially, the probability grades 234 may be compared to the first and second thresholds simultaneously or in any other order.

Returning to FIG. 2, once the classifier 236 classifies a subset of the disruption alerts 208 into an unknown disruption classification (362), the classifier 236 may provide the unknown alerts 238 to a refiner 240. The refiner 240 may perform one or more additional steps to determine whether a respective unknown alert 238 corresponds to a valid disruption or an invalid disruption. For example, in some embodiments, the refiner 240 may submit the unknown alerts 238 to the additional models 224 to generate iteration probability grades 242 for each of the unknown alerts 238 (364). As noted above, the additional models 224 may include different models than the primary model 222. However, the additional models 224 may be trained in a similar manner as the primary model 222 by the trainer 226. As such, the additional models 224 may yield different probability grades for each of the unknown alerts 238 due to variation in each additional model's 224 architecture, hyperparameters, and initialization, which may influence the model's ability to learn patterns from the training dataset 228.

The probability grades generated for a respective unknown alert 338 by the additional models 224 may be referred to herein as the iteration probability grades 242 for the unknown alert 338. For example, if the additional models 224 contain 100 models (each a different iteration of another), and each model 224 generates one probability grade for a single unknown alert 338, then the iteration probability grades 242 for each unknown alert 338 may include 100 probability grades. By generating numerous iteration probability grades 242 for each unknown alert 338, the disruptor validation engine 210 can estimate a range of confidence that a respective unknown alert 338 corresponds to a valid disruption (e.g., true positive) or an invalid disruption (e.g., false positive).

In some embodiments, in addition to submitting the unknown alerts 238 to the additional models 224, the refiner 240 may provide one or more of the unknown alerts 238 to a client device 214 for manual review or classification. For example, the refiner 240 may determine that a subset of the unknown alerts 238 contain a probability grade 234 and/or iteration probability grade 242 indicating the disruptor validation engine's 210 lack of confidence with classifying the unknown alert 238 as a valid alert or an invalid alert. As such, the refiner 240 may transmit an indication to the client device 214 that the subset of unknown alerts 238 require manual inspection. The client device 214 may be the same or similar to the client device 114 such that it corresponds to a disruption project manager or a disruptor development team member who is aiding in the development of the disruptors 204A-B for release. The user of the client device 214 may review a sample of the subset of unknown alerts 238 and provide an indication of whether the respective unknown alerts 238 should be classified as a valid disruption or an invalid disruption.

Once the probability grades 234 and/or iteration probability grades 242 are generated, the disruptor validation engine 210 may determine a quality grade for the disruptors 204A-B (366). In some embodiments, to determine the quality grade, the disruptor validation engine 210 may first generate a disruptor SNR estimation for each of the disruptors 204A-B (368). To calculate the disruptor SNR estimation for each of the disruptors 204A-B, the disruptor validation engine 210 may include an estimator 244. The disruptor SNR estimation may be a quantification of a disruptors 204A-B ability to accurately identify valid disruptions (e.g., true positives) versus invalid disruptions (e.g., false positives). As will be described in the following discussion, a higher disruptor SNR estimation may indicate clearer and more reliable identification of valid disruptions by a respective disruptor 204A-B.

The disruptor SNR estimation may be calculated via the following formula:

$$\text{Disruptor } \textit{SNR} \text{ Estimation } (DSE) = \frac{\text{Total } VC}{\text{Total } VC + \text{Total } IC}$$

where,
Total VC=Total number of valid disruption alerts; and
Total IC=Total number of invalid disruption alerts.

As described above, a valid disruption alert may indicate a true malicious or benign alert that requires a disruption action to stop an ongoing attack. An invalid disruption alert may cover the remaining disruption alerts and indicate either false activity or true malicious activity that does not require any disruption actions to stop the attack (e.g., unsuccessful brute-force attacks).

In some embodiments, the estimator 244 may measure the contribution of a respective disruption alert 208 as classified to determine a final valid disruption and invalid disruption computation. Since the model 222 is unlikely to grade all of the disruption alerts 208 with 100% probability (e.g., confidently identify all of the disruption alerts 208 as valid or invalid disruption alerts), the estimator 244 may generate a DSE range. That is, due to the inherent uncertainties of models 220, relying solely on a single DSE may be misleading. A single-value DSE may not fully capture the variability and noise present in the disruption alerts 208, leading to overconfidence in the models' 220 predictions. As a result, computing and using a disruptor SNR estimation range offers a more robust and reliable measure of disruptor quality. This DSE range can account for potential fluctuations and uncertainties, providing a more comprehensive understanding of signal quality. A DSE range may be computed via the following equation:

$$DSE \text{ Range} = [DSE_{LWB}, DSE_{UPB}]$$

where the $DSE_{LWB}$ and the $DSE_{UPB}$ define a range (e.g., lower bound, LWB, and upper bound, UPB) within which the DSE for a respective disruptor 204A-B is most likely to fall with a high (e.g., 95%, 95%) confidence.

To compute a DSE range for a respective disruptor 204A-B, the estimator 244 may measure a contribution of a respective disruption alert 208 as classified to determine a final valid disruption and invalid disruption computation. As described above, the disruption alerts 208 may be classified into one of the following classifications:

Valid disruption alert (VDA) classification if probability grades $234 \geq \text{Threshold}_1$;

Invalid disruption alert (IDA) classification if probability grades $234 \leq \text{Threshold}_2$; and Unknown alert classification if $\text{Threshold}_2 < \text{probability}$ grades $234 < \text{Threshold}_1$.

Using these classifications, the estimator 244 may determine a valid (e.g., true positive) contribution of the disruption alerts 208 and an invalid (e.g., false positive) contribution of the disruption alerts 208. To compute the valid contribution, the estimator 244 may calculate a contribution, p, for a respective disruption alert 208 classified into the VDA classification, and in some cases, a contribution of unknown alerts 238 classified into the unknown alert classification. The valid contribution may be computed using the following equation:

$$\text{Total Valid Contribution } (VC) = \sum_{i=0}^{x} p + \sum VC_{UA}$$

where, x is a total number of disruption alerts 208 within the VDA classification and the IDA classification; and
p is a contribution of a disruption alert 208 within the VDA classification or IDA classification.

Disruption alerts 208 classified into the VDA classification and the IDA classification may be considered to be confident grades. As such, in some embodiments, a respective disruption alert's 208 contribution (e.g., p) to the disruptors 204A-B validity is based on the corresponding probability grade 234. For example, if a disruption alert's 208 probability grade 234 is 0.95, then the disruption alert's 208 contribution, p, towards VDA is 0.95 and towards IDA is (1−p) i.e. 0.05. Similarly, if a disruption alert's 208 probability grade is 0.15, then the disruption alert's 208 contribution, p, towards VDA is 0.15 and towards IDA is 1−p, i.e. 0.85. In other embodiments, for disruption alert's 208 classified into the VDA classification, a respective contribution, p, may be 1 and for disruption alert's 208 classified into the IDA classification, a respective contribution, p, may be 0. In other words, disruption alerts 208 within the VDA classification may be computed to have a contribution, p, of 1 and for disruption alerts 208 within the IDA classification, the contribution, p, may be computed as 0.

Similarly, the estimator 244 may compute a total invalid contribution based on the disruption alerts 208 classification.

To compute the invalid contribution, the estimator 244 may calculate a contribution, 1−p, for a respective disruption alert 208 classified into the VDA classification, the IDA classification, and in some cases, a contribution of unknown alerts 238 classified into the unknown alert classification. The invalid contribution may be computed using the following equation:

$$\text{Total Invalid Contribution } (IC) = \sum_{i=0}^{x} 1 - p + \sum IC_{UA}$$

where, x is a total number of disruption alerts 208 within the VDA classification and the IDA classification; and
p is a contribution of a disruption alert 208 within the VDA classification and 1−p is a contribution of a disruption alert 208 within the IDA classification, as described above. That is, in some embodiments, the contribution of a respective disruption alert 208 classified within the VDA or IDA classifications may be equal to its respective probability grade 234 or may be computed to be a 1 or 0, depending on the classification.

To compute the contribution of the unknown alerts (UA) 338 to the total VC ($\Sigma VC_{UA}$) and the total IC ($\Sigma IC_{UA}$), the estimator 244 may use a variety of approaches. In one approach, the estimator 244 may use the iteration probability grades 242 to compute $\Sigma IC_{UA}$ and $\Sigma VC_{UA}$, while in another approach, the estimator 244 employ the use of human graders to determine $\Sigma IC_{UA}$ and $\Sigma VC_{UA}$.

In scenarios where the estimator 244 determines the total VC and the total IC for unknown alerts 238 using the iteration probability grades 242, the estimator 244 may compute a DSE for each iteration (e.g., each additional model 224). For example, the DSE for each iteration may be computed using the following equation:

$$DSE_{iteration} = \frac{\sum_{i=0}^{z} p}{\sum_{i=0}^{z} p + \sum_{i=0}^{z} 1 - p}$$

where, z equals to total number of unknown alerts 238; and
p equals the contribution of each unknown alert based on a respective iteration probability grade 242.

The estimator 244 may then use a percentile function to calculate a lower bound (LWB) and an upper bound (UPB) estimate of the $DSE_{iterations}$ computed from the unknown alerts 238 with a high (e.g., 95%) confidence. Using the lower and upper bound estimates of the $DSE_{iterations}$, the estimator 244 may calculate a lower bound and upper bound for each of the VDA and the IDA contributions, as defined by the following equations:

$$LWBVC_{UA} = z * DSE_{iterations,LWB}$$

$$LWBIC_{UA} = z - LWBVC_{UA}$$

$$UPBVC_{UA} = z * DSE_{iterations,UPB}$$

$$UPBIC_{UA} = z - UPBVC_{UA}$$

where, z is equal to the number of unknown alerts 238;
$DSE_{iterations}$, LWB equals the lower bound of a summation of the $DSE_{iterations}$ for all the unknown alerts 238; and $DSE_{iterations}$, UPB equals the upper bound of a summation of the $DSE_{iterations}$ for all the unknown alerts 238.

Now that the lower and upper bounds for the contribution of the unknown alerts 238 to the VDA and IDA is computed, the estimator 244 may compute ranges for the total VC and the total IC from both the confidently graded disruption alerts 208 and the unknown alerts 238. That is, the estimator 244 may compute the total VC to include the unknown alerts 238 contribution. To compute the total VC to include the unknown alerts' 238 contribution, the estimator 244 may compute the total VC as a range, including a total $VC_{LWB}$ and a total $VC_{UPB}$, each of which may be calculated via the following equations:

$$\text{Total } VC_{LWB} = \sum_{i=0}^{x} p + LWBVC_{UA}$$

$$\text{Total } VC_{UPB} = \sum_{i=0}^{x} p + UPBVC_{UA}$$

Similarly, the estimator 244 may compute the total IC to include the unknown alerts 238 contribution. To compute the total IC to include the unknown alerts' 238 contribution, the estimator 244 may compute the total IC as a range, including a total $IC_{LWB}$ and a total $IC_{UPB}$, each of which may be calculated via the following equations:

$$\text{Total } IC_{LWB} = \sum_{i=0}^{x} 1 - p + LWBIC_{UA}$$

$$\text{Total } IC_{UPB} = \sum_{i=0}^{x} 1 - p + UPBIC_{UA}$$

Then using the total VC range and the total IC range, the estimator 244 may compute the DSE range for the respective disruptor 204A-B. For example, the estimator 244 may use the following equations to compute the DSE range:

$$DSE_{LWB} = \frac{\text{Total } VC_{LWB}}{\text{Total } VC_{LWB} + \text{Total } IC_{LWB}}$$

$$DSE_{UPB} = \frac{\text{Total } VC_{UPB}}{\text{Total } VC_{UPB} + \text{Total } IC_{UPB}}$$

$$DSE \text{ Range} = [DSE_{LWB}, DSE_{UPB}]$$

As noted above, the estimator 244 may employ the use of human graders to determine the contribution of unknown alerts 238 to the total VC and the total IC for a respective disruptor 204A-B. In such scenarios, the estimator 244 may gather a stratified sample of a predefined number (e.g., 40) of unknown alerts 238 from the population of unknown alerts 238 and send the sample to the client device 214 or other human graders to provide a definite classification of the subset of unknown alerts 238. The estimator 244 may receive the definite classification of the subset of unknown alerts 238 from the human graders (e.g., the client device 214) and compute a true positive rate (TPR) and a false positive rate (FPR) based on the sample population of unknown alerts 238. For example, the TPR and the FPR may be computed as followed:

$$TPR = \frac{\text{Total } VDA}{y}$$

$$FPR = \frac{\text{Total } IDA}{y}$$

where, y equals the number of unknown alerts in the sample (e.g., the subset of unknown alerts 238 graded by human graders);

Total VDA equals the total number of unknown alerts 238 graded as valid disruption alerts; and Total IDA equals the total number of unknown alerts 238 graded as invalid disruption alerts.

Using the TPR and FPR, the estimator 244 may determine the $VC_{UA}$ and the $IC_{UA}$ using the following equations:

$$VC_{UA} = z * TPR$$

$$IC_{UA} = z * FPR$$

where, z equals the total number of unknown alerts 238. Then, using these contributions, the DSE for unknown alerts 238 may be calculated as:

$$DSE_{UA} = \frac{VC_{UA}}{VC_{UA} - IC_{UA}}$$

To further refine the estimation, the estimator 244 may employ the Wilson score interval with a 95% confidence interval to calculate the lower bound and upper bound for the $DSE_{UA}$. For example, the $DSE_{LWB}$ and $DSE_{UPB}$ may be calculated via the following equation:

$$DSE_{LWB,UPB} = \frac{1}{1 + \frac{z_{\alpha/2}^2}{n}}\left(\hat{p} + \frac{z_{\alpha/2}^2}{2n}\right) \pm \frac{z_{\alpha/2}^2}{1 + \frac{z_{\alpha/2}^2}{n}}\sqrt{\frac{\hat{p}(1-\hat{p})}{n} + \frac{z_{\alpha/2}^2}{4n^2}}$$

where, $$\hat{p} = \frac{x}{n};$$

n=total number of sample size sent for human validation;

x equals total number of valid disruptions in the sample set; and $$z_{\alpha/2}^2$$

equals critical value from the standard normal distribution for the desired confidence level (e.g., $z_{\alpha/2}$ for 95% confidence level is 1.96)

Then the estimator 244 may compute the lower bound and upper bound VC and IC of the unknown alerts 238 using the following equations:

$$LWBVC_{UA} = z * DSE_{LWB}$$

$$LWBIC_{UA} = z - LWBVC_{UA}$$

$$UPBVC_{UA} = z * DSE_{UPB}$$

$$UPBIC_{UA} = z - UPBVC_{UA}$$

where, z is equal to the number of unknown alerts 238.

Finally, as described above, the DSE range may be computed using the ranges of lower bound and upper bounds of the VC and IC for the unknown alerts 238.

Once the DSE or DSE range is computed, the disruptor validation engine 210 may generate a quality grade for the respective disruptor 204A-B. In particular, the disruptor validation engine 210 may include a quality grader 246 which may include a quality grader 246 which may grade the disruptors 204A-B based on the respective DSE or DSE range, as well as the proportion of unknown alerts, defined as the percentage of alerts in the unknown category relative to the total disruption alerts generated by a disruptor 204A-B. For example, if the weight of unknown alerts for a disruptor 204A-B exceeds a pre-defined threshold, such as 40%, the quality grader 246 may determine that the primary model 222 needs fine-tuning. Conversely, if a disruptor 204A-B having a DSE or a $DSE_{LWB}$ greater than a preset quality value, such as 90%, may be ready for release. That is, a disruptor 204A-B meeting or exceeding a preset quality value may be in a state requiring minimal-to-no further refinement before release. In contrast, if the quality grader 246 determines that one or more of the disruptors 204A-B has a DSE or a $DSE_{LWB}$ that is less than 90%, then the quality grader 246 may flag the respective disruptor 204A-B as requiring further validation and/or refinement by the development team. In some cases, the quality grader 246 may flag disruptors 204A-B having an unknown alert weight which is the percentage of unknown alert category count out of total disruption alerts from a disruptor that is less than a refinement value, such as 40%, as requiring tuning of the primary model 222.

Based on the quality grade generated by the quality grader 246, the disruptor validation engine 210 may generate a verdict for the disruptors 204A-B. Specifically, the disruptor validation engine 210 may include a verdict generator 248 that generates a verdict 250 for each of the disruptors 204A-B. In some embodiments, the verdict 250 may indicate whether a respective disruptor 204A-B is recommended for release or requires further refinement. Once generated, the verdict 250 may be provided to the client device 214, such as part of a verdict report like the report 118.

Referring now to FIG. 5, an example verdict report 518 generated by a disruptor validation engine is illustrated, according to an embodiment herein. The verdict report 518 may be generated by a disruptor validation engine, such as the disruptor validation engine 210, and may include verdicts 550 for disruptors 504. A shown, for each disruptor, the verdict table 518 may include the name of the disruptor 504, a quality grade 576, a lower bound (LB) and an upper bound (UB) for the quality grade 508, and a final verdict 550, along with a total alert count and a total unknown alert count identified by the disruptor validation engine 210.

As shown, for the disruptors 504 in lines 574A, 574B, and 574D, the disruptor validation engine 210 recommends releasing the disruptor because the quality grade 576 of the respective disruptor 504 exceeds a preset quality value, here 90%. In contrast, the disruptor validation engine 210 recommends that the disruptors 504 in lines 574C and 574E be further assessed and/or refined because the quality grade 576 fails to exceed the preset quality value. Based on the final verdicts 510 a disruption project manager or a disruptor development team may release the respective disruptor 504. The verdict report 518 also includes a total alert count 751 and an unknown alert count 573. Based on these values, a reviewer may evaluate how many disruption alerts a respective disruptor was unable to categories as either valid or invalid with high confidence.

Referring now to FIG. 6, an example table 600 providing a probability bin disruption used to select thresholds for a respective model is provided, according to an embodiment herein. As noted above, the first threshold and the second threshold may be determined based on the primary model 222. Specifically, the first threshold and second threshold may be tuned for the primary model 222 during the training process. For example, during an inference phase of model training, the primary model 222, which was trained on the training dataset 228, may generate probability grades for an inference dataset. The inference dataset may be a collection of historical disruption alerts used during the evaluation phase of the primary model 222 to assess the primary model's 222 performance on the new, unseen data. The resulting probability grades generated by the primary model 222 during the inference phase may be used to tune and select a first threshold 670 and a second threshold 672, which may be used to define the various disruption alert classifications.

To tune and select the first threshold 670 and the second threshold 672, translated labels (e.g., ground truth data) of the inference dataset may be generated, as described above with respect to labeling. Then, a translated SNR may be computed using the following equation:

$$SNR_{Translated} = \frac{100 * VC_{Translated}}{VC_{Translated} + IC_{Translated}}$$

Where $VC_{Translated}$=number of disruption alerts that are valid as indicated by historical alert actions and customer disruption alert feedback; and $IC_{Translated}$=number of disruption alerts that are invalid as indicated by historical alert actions and customer disruption alert feedback.

The probability bin distribution in table 600 may be a distribution of the translated labels and $SNR_{Translated}$ generated based on the inference dataset. That is the table 600 illustrates a number of disruption alerts identified as VDA and the number of disruption alerts identified by IDA by the primary model 222, along with a corresponding $SNR_{Translated}$. In the illustrated example, the table 600 includes 109,075 disruption alerts and probability grades for these disruption alerts as generated across the range of probability grade bins.

Using the table 600, the first threshold 670 and the second threshold 672 may be selected to optimize the primary model's 222 performance, in particular focusing on maximizing Precision and F1-score while minimizing the count of unknown alerts. As such, the first and second thresholds 670, 672, may be selected so that the overall $SNR_{Translated}$ (within the probability bin: [0-1]) is significantly higher than the $SNR_{Translated}$ of the first threshold bucket, and the $SNR_{Translated}$ of the second threshold bucket is significantly lower than the overall $SNR_{Translated}$, such as closer to 0.

Referring to FIG. 7, FIG. 7 illustrates a computing apparatus 791 that may be used for providing a disruptor validation engine and related functions, as described herein. For example, the client devices 102A-B, 202A-B, 214 may be or include the computing apparatus 791. As illustrated, the computing apparatus 791 includes a processing system 792 that includes a microprocessor and other circuitry that retrieves and executes software 795 from storage system 793. The processing system 792 may be implemented within a single processing device but may also be distributed across multiple processing devices or sub-systems that cooperate in executing program instructions. Examples of the processing system 792 include general purpose central processing units, graphical processing units, application specific processors, and logic devices, as well as any other type of processing device, combinations, or variations thereof.

The storage system 793 may comprise any computer-readable storage media or medium readable by processing system 792 and capable of storing software 795. The storage system 793 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations the storage system 793 may also include computer readable communication media over which at least some of the software 795 may be communicated internally or externally. The storage system 793 may be implemented as a single storage device but may also be implemented across multiple storage devices or sub-systems co-located or distributed relative to each other. The storage system 793 may comprise additional elements, such as a controller capable of communicating with the processing system 792 or possibly other systems.

The software 795 (including disruptor validation engine process 796) may be implemented in program instructions and among other functions may, when executed by the processing system 792, direct the processing system 792 to operate as described with respect to the various operational scenarios, sequences, and processes illustrated herein. For example, the software 795 may include program instructions for implementing a disruptor validation engine and related functions, such as the process 300 or the process 400, as described herein. In some cases, the software 795 may cause one or more features of the disruptor validation engine process 796 to provide or display respective components to a user via a user interface system 799 inoperable communication with a client device, such as the client device 114.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. The software 795 may include additional processes, programs, or components, such as operating system software, virtualization software, or other application software. The software 795 may also comprise firmware or some other form of machine-readable processing instructions executable by the processing system 792.

In general, the software 795 may, when loaded into the processing system 792 and executed, transform a suitable apparatus, system, or device (of which computing apparatus 791 is representative) overall from a general-purpose computing system into a special-purpose computing system customized to generate features, functionality, and user experiences provided by the disruptor validation engine. Indeed, encoding the software 795 on the storage system 793 may transform the physical structure of the storage system

793. The specific transformation of the physical structure may depend on various factors in different implementations of this description. Examples of such factors may include, but are not limited to, the technology used to implement the storage media of the storage system 793 and whether the computer-storage media are characterized as primary or secondary storage, as well as other factors.

For example, if the computer readable storage media are implemented as semiconductor-based memory, the software 795 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 797 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between the computing apparatus 791 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and back-planes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

Examples are described herein in the context of systems and methods for providing a disruptor validation engine and related functions. Those of ordinary skill in the art will realize that the foregoing description is illustrative only and is not intended to be in any way limiting. Reference is made in detail to implementations of examples as illustrated in the accompanying drawings. The same reference indicators will be used throughout the drawings and the following description to refer to the same or like items.

Additionally, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure. In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Examples

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a computing apparatus comprising: a computer-readable storage medium; a disruptor validation engine comprising processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: determine a plurality of disruption alerts associated with one or more disruptors, wherein a disruption alert of the plurality of disruption alerts indicates potential malicious activity within a tenant environment; generate a probability grade for one or more disruption alerts of the plurality of disruption alerts, wherein the probability grade indicates a likelihood that the potential malicious activity is actually malicious; determine a disruption classification for the one or more disruption alerts based on the probability grade; and generate a quality grade for the one or more disruptors based on the disruption classification of the one or more disruption alerts of the plurality of disruption alerts.

Example 2 is the computing apparatus of any previous or subsequent Example, wherein the processor-executable instructions to generate the quality grade for the one or more disruptors based on the disruption classification of each disruption alert, when executed by the one or more processors, further direct the computing apparatus to: generate a disruptor signal-to-noise ratio (SNR) estimation for each of the one or more disruptors based on the disruption classification for each of the plurality of disruption alerts.

Example 3 is the computing apparatus of any previous or subsequent Example, wherein the processor-executable instructions to determine the disruption classification for each of the plurality of disruption alerts based on the probability grade, when executed by the one or more processors, further direct the computing apparatus to: determine a first disruption classification for a first subset of disruption alerts; and determine a second disruption classification for a second subset of disruption alerts, wherein: the first disruption classification indicates that the first subset of disruption alerts corresponds to a valid disruption; the second disruption classification indicates that the second subset of disruption alerts corresponds to an invalid disruption; and the plurality of disruption alerts comprises the first subset of disruption alerts and the second subset of disruption alerts.

Example 4 is the computing apparatus of any previous or subsequent Example, wherein: the one or more disruptors comprises a first disruptors; and the processor-executable instructions to generate the quality grade for the one or more disruptors based on the disruption classification of the one or more disruption alerts, when executed by the one or more processors, further direct the computing apparatus to: determine a confidence contribution for the one or more disruption alerts in each of the disruption classification; generate a contribution summation for each of the disruption classifications based on the confidence contributions for the one or more disruption alerts in each respective disruption classification; and determine a disruptor signal-to-noise ratio (SNR) estimation range for the first disruptor based on the contribution summation for each disruption classification.

Example 5 is the computing apparatus of any previous or subsequent Example, wherein the disruptor validation engine comprises a machine learning (ML) model and the processor-executable instructions, when executed by the one or more processors, further direct the computing apparatus to: train the ML model on a training dataset based on historical disruption alerts, wherein the training dataset comprises: a plurality of disruption alert features; and a plurality of alert responses; test the ML model on an inference dataset, wherein the inference dataset is different from the training dataset; and determine a threshold range for the disruption classification based on testing on the inference dataset.

Example 6 is the computing apparatus of any previous or subsequent Example, wherein: the processor-executable instructions to generate the probability grade for each of the plurality of disruption alerts, when executed by the one or more processors, further direct the computing apparatus to: submit the plurality of disruption alerts to a first ML model; and receive, from the first ML model a first plurality of probability grades, wherein each of the first plurality of probability grades corresponds to a respective disruption alert of the plurality of disruption alerts; and the processor-executable instructions to determine the disruption classification for each of the plurality of disruption alerts based on the probability grade, when executed by the one or more processors, further direct the computing apparatus to: determine an unknown disruption classification for a subset of disruption alerts based on a subset of probability grades corresponding to the subset of disruption alerts, wherein the plurality of disruption alerts comprises the subset of disruption alerts; and the first plurality of probability grades comprises the subset of probability grades; and submit the subset of disruption alerts to one or more additional ML models; receive, from the one or more additional ML models, a second plurality of probability grades for a disruption alert in the subset of disruption alerts; and determine the disruption classification for each of the plurality of disruption alerts based on the first plurality of probability grades and the second plurality of probability grades.

Example 7 is a method comprising: determining, by a disruptor validation engine, a plurality of disruption alerts associated with one or more disruptors, wherein: a disruption alert of the plurality of disruption alerts indicates potential malicious activity within a tenant environment; and the disruptor validation engine comprises a machine-learning (ML) model; generating, by the ML model of the disruptor validation engine, a probability grade for one or more disruption alerts, wherein the probability grade indicates a likelihood that the potential malicious activity is actually malicious; determining, by the disruptor validation engine, a disruption classification for each of the plurality of disruption alerts based on the probability grade; and generating, by the disruptor validation engine, a quality grade for the one or more disruptors based on the disruption classification of the one or more disruption alerts of the plurality of disruption alerts.

Example 8 is the method of any previous or subsequent Example, wherein: determining, by the disruptor validation engine, the disruption classification for each of the plurality of disruption alerts comprises: determining a first disruption classification for a first subset of disruption alerts; and determining a second disruption classification for a second subset of disruption alerts, wherein: the first disruption classification indicates that the first subset of disruption alerts corresponds to a valid disruption; the second disruption classification indicates that the second subset of disruption alerts corresponds to an invalid disruption; and the plurality of disruption alerts comprises the first subset of disruption alerts and the second subset of disruption alerts; and generating, by the disruptor validation engine, the quality grade for the one or more disruptors based on the disruption classification of the one or more disruption alerts of the plurality of disruption alerts further comprises: generating, by the disruptor validation engine, a disruptor signal-to-noise ratio (SNR) estimation for each of the one or more disruptors based on the first disruption classification and the second disruption classification.

Example 9 is the method of any previous or subsequent Example, wherein determining, by the disruptor validation engine, the disruption classification for each of the plurality of disruption alerts based on the probability grade comprises: comparing, by the disruptor validation engine, each of the plurality of disruption alerts to a first threshold; determining, by the disruptor validation engine a first disruption classification for a first subset of disruption alerts based on the first subset of disruption alerts exceed the first threshold; comparing, by the disruptor validation engine, each of the plurality of disruption alerts a second threshold; determining, by the disruptor validation engine, a second disruption classification for a second subset of disruption alerts based on the second subset of disruption alerts failing to meet the second threshold; and determining, by the disruptor validation engine, a third disruption classification for a third subset of disruption alerts, wherein the third subset of disruption alerts fail to meet the first threshold and exceed the second threshold, wherein the plurality of disruption alerts comprises the first subset of disruption alerts, the second subset of disruption alerts, and the third subset of disruption alerts.

Example 10 is the method of any previous or subsequent Example, wherein the method further comprises: training, by the disruptor validation engine, the ML model on a training dataset based on historical disruption alerts, wherein the training dataset comprises: a plurality of disruption alert features; a plurality of alert responses; testing, by the disruptor validation engine, the ML model on an inference dataset, wherein the inference dataset is different from the training dataset; and modifying, by the disruptor validation engine, one or more parameters of the ML model based on testing on the inference dataset.

Example 11 is the method of any previous or subsequent Example, wherein the one or more disruptors comprise a first disruptor and generating, by the disruptor validation engine, the quality grade for the one or more disruptors based on the disruption classification of the one or more disruption alerts of the plurality of disruption alerts further comprises: determining, by the disruptor validation engine, a disruptor signal-to-noise ratio (SNR) estimation range for the first disruptor, wherein the disruptor SNR estimation range comprises a disruptor SNR lower bound and a disruptor SNR upper bound.

Example 12 is the method of any previous or subsequent Example, wherein: generating, by the ML model of the disruptor validation engine, the probability grade for each of the plurality of disruption alerts comprises: submitting the plurality of disruption alerts to a first ML model; and receiving, from the first ML model a first plurality of probability grades, wherein each of the first plurality of probability grades corresponds to a respective disruption alert of the plurality of disruption alerts; and determining, by the disruptor validation engine, the disruption classification for each of the plurality of disruption alerts comprises: determining, by the disruptor validation engine, an unknown disruption classification for a subset of disruption alerts based on a subset of probability grades corresponding to the subset of disruption alerts, wherein the plurality of disruption alerts comprises the subset of disruption alerts; and the first plurality of probability grades comprises the subset of probability grades; and determining, by the disruptor validation engine, a second plurality of probability grades for a disruption alert in the subset of disruption alerts; and determining, by the disruptor validation engine, the disruption classification for each of the plurality of disruption alerts based on the first plurality of probability grades and the second plurality of probability grades.

Example 13 is the method of any previous or subsequent Example, wherein the method comprises: generating, by the disruptor validation engine, a final verdict for each of the one or more disruptors based on the quality grade of a respective disruptor.

Example 14 is the method of any previous or subsequent Example, wherein generating, by the disruptor validation engine, the quality grade for the one or more disruptors based on the disruption classification of the one or more disruption alerts comprises: determining, by the disruptor validation engine, a confidence contribution for the one or more disruption alerts in each of the disruption classification; generating, by the disruptor validation engine, a contribution summation for each of the disruption classifications based on the confidence contributions for the one or more disruption alerts in each respective disruption classification; and determining the quality grade for each of the one or more disruptors based on the contribution summation for each disruption classification.

Example 15 is a computer readable storage media comprising processor-executable instructions configured to cause one or more processors to: determine, by a disruptor validation engine, a plurality of disruption alerts associated with one or more disruptors, wherein a disruption alert of the plurality of disruption alerts indicates potential malicious activity within a tenant environment; generate, by the disruptor validation engine, a probability grade for one or more disruption alerts of the plurality of disruption alerts, wherein the probability grade indicates a likelihood that the potential malicious activity is actually malicious; determine, by the disruptor validation engine, a disruption classification for each of the plurality of disruption alerts based on the probability grade; determine, by the disruptor validation engine, a disruptor signal-to-noise ratio (SNR) estimation for the one or more disruptors based on the disruption classification of the one or more disruption alerts; and generate, by the disruptor validation engine, a quality grade for the one or more disruptors based on the disruptor SNR estimation of the one or more disruptors of the plurality of disruption alerts.

Example 16 is the computer readable storage media of any previous or subsequent Example, wherein: the processor-executable instructions to determine, by the disruptor validation engine, the disruption classification for each of the plurality of disruption alerts cause the one or more processors to further execute processor-executable instructions stored in the computer readable storage media to: determine, by the disruptor validation engine, a first disruption classification for a first subset of disruption alerts; and determine, by the disruptor validation engine, a second disruption classification for a second subset of disruption alerts, wherein: the first disruption classification indicates that the first subset of disruption alerts corresponds to a valid disruption; the second disruption classification indicates that the second subset of disruption alerts corresponds to an invalid disruption; and the plurality of disruption alerts comprises the first subset of disruption alerts and the second subset of disruption alerts; and the processor-executable instructions to generate, by the disruptor validation engine, the quality grade for the one or more disruptors based on the disruptor SNR estimation of the one or more disruptors cause the one or more processors to further execute processor-executable instructions stored in the computer readable storage media to: generate, by the disruptor validation engine, the quality grade for the one or more disruptors based on the first disruption classification and the second disruption classification.

Example 17 is the computer readable storage media of any previous or subsequent Example, wherein the processor-executable instructions to determine, by the disruptor validation engine, the disruption classification for each of the plurality of disruption alerts cause the one or more processors to further execute processor-executable instructions stored in the computer readable storage media to: determine, by the disruptor validation engine, a first disruption classification for a first subset of disruption alerts based on the first subset of disruption alerts exceeding a first threshold; determine, by the disruptor validation engine, a second disruption classification for a second subset of disruption alerts based on the second subset of disruption alerts failing to meet a second threshold; and determine, by the disruptor validation engine, a third disruption classification for a third subset of disruption alerts, wherein the third subset of disruption alerts fail to meet the first threshold and exceed the second threshold: wherein the plurality of disruption alerts comprises the first subset of disruption alerts, the second subset of disruption alerts, and the third subset of disruption alerts.

Example 18 is the computer readable storage media of any previous or subsequent Example, wherein the processor-executable instructions to determine, by the disruptor validation engine, the disruption classification for each of the plurality of disruption alerts cause the one or more processors to further execute processor-executable instructions stored in the computer readable storage media to: determine, by the disruptor validation engine, an unknown disruption classification for a subset of disruption alerts based on the probability grades for the one or more disruption alerts in the subset of disruption alerts, wherein the plurality of disruption alerts comprises the subset of disruption alerts; and the; and receive, from a plurality of machine learning (ML) models, a plurality of iteration probability grades for the subset of disruption alerts, wherein each ML model of the plurality of ML model generates a respective iteration probability grade based on the subset of disruption alerts.

Example 19 is the computer readable storage media of any previous or subsequent Example, wherein the disruptor validation engine comprises a machine learning (ML) model and the processor-executable instructions, cause the one or more processors to further execute processor-executable instructions stored in the computer readable storage media to: train the ML model on a training dataset based on historical disruption alerts, wherein the training dataset comprises: a plurality of disruption alert features; and a plurality of alert responses; test the ML model on an inference dataset, wherein the inference dataset is different from the training dataset; and determine a threshold range for the disruption classification based on testing on the inference dataset.

Example 20 is the computer readable storage media of any previous or subsequent Example, wherein the processor-executable instructions to determine, by the disruptor validation engine, the disruptor SNR for the one or more disruptors based on the disruption classification of the one or more disruption alerts cause the one or more processors to further execute processor-executable instructions stored in the computer readable storage media to: determine, by the disruptor validation engine, a disruptor signal-to-noise ratio (SNR) estimation range for the one or more disruptors, wherein the disruptor SNR estimation range comprises a disruptor SNR lower bound and a disruptor SNR upper bound; and generate, by the disruptor validation engine, a final verdict for each of the one or more disruptors based on the SNR estimation range.

What is claimed is:
1. A distributor validation engine comprising:
a non-transitory computer-readable storage medium comprising processor-executable instructions stored on the non-transitory computer-readable storage medium; and
one or more processors coupled to the computer-readable storage medium and configured to execute the processor-executable instructions, wherein the processor-executable instructions, when executed by the one or more processors, direct the distributor validation engine, to at least:
determine a plurality of disruption alerts associated with one or more disruptors, wherein a disruption alert of the plurality of disruption alerts indicates potential malicious activity within a tenant environment;
generate a probability grade for one or more disruption alerts of the plurality of disruption alerts, wherein the probability grade indicates a likelihood that the potential malicious activity is actually malicious;
determine a disruption classification for the one or more disruption alerts based on the probability grade; and generate a quality grade for the one or more disruptors based on the disruption classification of the one or more disruption alerts of the plurality of disruption alerts.

2. The distributor validation engine of claim 1, wherein the processor-executable instructions to generate the quality grade for the one or more disruptors based on the disruption classification of each disruption alert, when executed by the one or more processors, further direct the distributor validation engine to:
generate a disruptor signal-to-noise ratio (SNR) estimation for each of the one or more disruptors based on the disruption classification for each of the plurality of disruption alerts.

3. The distributor validation engine of claim 1, wherein the processor-executable instructions to determine the disruption classification for each of the plurality of disruption alerts based on the probability grade, when executed by the one or more processors, further direct the distributor validation engine to:
determine a first disruption classification for a first subset of disruption alerts; and
determine a second disruption classification for a second subset of disruption alerts, wherein:
the first disruption classification indicates that the first subset of disruption alerts corresponds to a valid disruption;
the second disruption classification indicates that the second subset of disruption alerts corresponds to an invalid disruption; and
the plurality of disruption alerts comprises the first subset of disruption alerts and the second subset of disruption alerts.

4. The distributor validation engine of claim 1, wherein:
the one or more disruptors comprises a first disruptors; and
the processor-executable instructions to generate the quality grade for the one or more disruptors based on the disruption classification of the one or more disruption alerts, when executed by the one or more processors, further direct the distributor validation engine to:
determine a confidence contribution for the one or more disruption alerts in each of the disruption classification;
generate a contribution summation for each of the disruption classifications based on the confidence contributions for the one or more disruption alerts in each respective disruption classification; and
determine a disruptor signal-to-noise ratio (SNR) estimation range for the first disruptor based on the contribution summation for each disruption classification.

5. The distributor validation engine of claim 1, wherein the disruptor validation engine comprises a machine learning (ML) model and the processor-executable instructions, when executed by the one or more processors, further direct the distributor validation engine to:
train the ML model on a training dataset based on historical disruption alerts, wherein the training dataset comprises:
a plurality of disruption alert features; and
a plurality of alert responses;
test the ML model on an inference dataset, wherein the inference dataset is different from the training dataset; and
determine a threshold range for the disruption classification based on testing on the inference dataset.

6. The distributor validation engine of claim 1, wherein:
the processor-executable instructions to generate the probability grade for each of the plurality of disruption alerts, when executed by the one or more processors, further direct the distributor validation engine to:
submit the plurality of disruption alerts to a first ML model; and
receive, from the first ML model a first plurality of probability grades, wherein each of the first plurality of probability grades corresponds to a respective disruption alert of the plurality of disruption alerts; and
the processor-executable instructions to determine the disruption classification for each of the plurality of disruption alerts based on the probability grade, when executed by the one or more processors, further direct the computing apparatus to:
determine an unknown disruption classification for a subset of disruption alerts based on a subset of probability grades corresponding to the subset of disruption alerts, wherein the plurality of disruption alerts comprises the subset of disruption alerts; and the first plurality of probability grades comprises the subset of probability grades; and
submit the subset of disruption alerts to one or more additional ML models;
receive, from the one or more additional ML models, a second plurality of probability grades for a disruption alert in the subset of disruption alerts; and
determine the disruption classification for each of the plurality of disruption alerts based on the first plurality of probability grades and the second plurality of probability grades.

7. A method implemented by one or more processors executing instructions stored on a non-transitory computer-readable medium comprising:
determining a plurality of disruption alerts associated with one or more disruptors, wherein a disruption alert of the plurality of disruption alerts indicates potential malicious activity within a tenant environment;
generating, using a machine-learning (ML) model, a probability grade for one or more disruption alerts, wherein the probability grade indicates a likelihood that the potential malicious activity is actually malicious;
determining a disruption classification for each of the plurality of disruption alerts based on the probability grade; and
generating a quality grade for the one or more disruptors based on the disruption classification of the one or more disruption alerts of the plurality of disruption alerts.

8. The method of claim 7, wherein:
determining the disruption classification for each of the plurality of disruption alerts comprises:
determining a first disruption classification for a first subset of disruption alerts; and
determining a second disruption classification for a second subset of disruption alerts, wherein:
the first disruption classification indicates that the first subset of disruption alerts corresponds to a valid disruption;
the second disruption classification indicates that the second subset of disruption alerts corresponds to an invalid disruption; and
the plurality of disruption alerts comprises the first subset of disruption alerts and the second subset of disruption alerts; and generating the quality grade for the one or more disruptors based on the disruption classification of the one or more disruption alerts of the plurality of disruption alerts further comprises:
generating a disruptor signal-to-noise ratio (SNR) estimation for each of the one or more disruptors based on the first disruption classification and the second disruption classification.

9. The method of claim 7, wherein determining the disruption classification for each of the plurality of disruption alerts based on the probability grade comprises:
comparing each of the plurality of disruption alerts to a first threshold;
determining a first disruption classification for a first subset of disruption alerts based on the first subset of disruption alerts exceed the first threshold;
comparing each of the plurality of disruption alerts a second threshold;
determining a second disruption classification for a second subset of disruption alerts based on the second subset of disruption alerts failing to meet the second threshold; and
determining a third disruption classification for a third subset of disruption alerts, wherein the third subset of disruption alerts fail to meet the first threshold and exceed the second threshold,
wherein the plurality of disruption alerts comprises the first subset of disruption alerts, the second subset of disruption alerts, and the third subset of disruption alerts.

10. The method of claim 7, wherein the method further comprises:
training the ML model on a training dataset based on historical disruption alerts, wherein the training dataset comprises:
a plurality of disruption alert features;
a plurality of alert responses;
testing the ML model on an inference dataset, wherein the inference dataset is different from the training dataset; and
modifying one or more parameters of the ML model based on testing on the inference dataset.

11. The method of claim 7, wherein the one or more disruptors comprise a first disruptor and generating the quality grade for the one or more disruptors based on the disruption classification of the one or more disruption alerts of the plurality of disruption alerts further comprises:
determining a disruptor signal-to-noise ratio (SNR) estimation range for the first disruptor, wherein the disruptor SNR estimation range comprises a disruptor SNR lower bound and a disruptor SNR upper bound.

12. The method of claim 7, wherein:
generating, by the ML model, the probability grade for each of the plurality of disruption alerts comprises:
submitting the plurality of disruption alerts to a first ML model; and
receiving, from the first ML model a first plurality of probability grades, wherein each of the first plurality of probability grades corresponds to a respective disruption alert of the plurality of disruption alerts; and
determining the disruption classification for each of the plurality of disruption alerts comprises:
determining an unknown disruption classification for a subset of disruption alerts based on a subset of probability grades corresponding to the subset of disruption alerts, wherein the plurality of disruption alerts comprises the subset of disruption alerts; and
the first plurality of probability grades comprises the
subset of probability grades; and
determining a second plurality of probability grades for
a disruption alert in the subset of disruption alerts;
and
determining the disruption classification for each of the
plurality of disruption alerts based on the first plurality
of probability grades and the second plurality of prob-
ability grades.

13. The method of claim 7, wherein the method com-
prises:
generating a final verdict for each of the one or more
disruptors based on the quality grade of a respective
disruptor.

14. The method of claim 7, wherein generating the quality
grade for the one or more disruptors based on the disruption
classification of the one or more disruption alerts comprises:
determining a confidence contribution for the one or more
disruption alerts in each of the disruption classification;
generating a contribution summation for each of the
disruption classifications based on the confidence con-
tributions for the one or more disruption alerts in each
respective disruption classification; and
determining the quality grade for each of the one or more
disruptors based on the contribution summation for
each disruption classification.

15. A non-transitory computer readable storage media
comprising processor-executable instructions configured to
cause one or more processors to:
determine a plurality of disruption alerts associated with
one or more disruptors, wherein a disruption alert of the
plurality of disruption alerts indicates potential mali-
cious activity within a tenant environment;
generate a probability grade for one or more disruption
alerts of the plurality of disruption alerts, wherein the
probability grade indicates a likelihood that the poten-
tial malicious activity is actually malicious;
determine a disruption classification for each of the plu-
rality of disruption alerts based on the probability
grade;
determine a disruptor signal-to-noise ratio (SNR) estima-
tion for the one or more disruptors based on the
disruption classification of the one or more disruption
alerts; and
generate a quality grade for the one or more disruptors
based on the disruptor SNR estimation of the one or
more disruptors of the plurality of disruption alerts.

16. The non-transitory computer readable storage media
of claim 15, wherein:
the processor-executable instructions to determine the
disruption classification for each of the plurality of
disruption alerts cause the one or more processors to
further execute processor-executable instructions
stored in the computer readable storage media to:
determine a first disruption classification for a first subset
of disruption alerts; and
determine a second disruption classification for a second
subset of disruption alerts, wherein:
the first disruption classification indicates that the first
subset of disruption alerts corresponds to a valid
disruption;
the second disruption classification indicates that the
second subset of disruption alerts corresponds to an
invalid disruption; and the plurality of disruption alerts comprises the first
subset of disruption alerts and the second subset of
disruption alerts; and
the processor-executable instructions to generate the qual-
ity grade for the one or more disruptors based on the
disruptor SNR estimation of the one or more disruptors
cause the one or more processors to further execute
processor-executable instructions stored in the com-
puter readable storage media to:
generate the quality grade for the one or more disrup-
tors based on the first disruption classification and
the second disruption classification.

17. The non-transitory computer readable storage media
of claim 15, wherein the processor-executable instructions
to determine the disruption classification for each of the
plurality of disruption alerts cause the one or more proces-
sors to further execute processor-executable instructions
stored in the computer readable storage media to:
determine a first disruption classification for a first subset
of disruption alerts based on the first subset of disrup-
tion alerts exceeding a first threshold;
determine a second disruption classification for a second
subset of disruption alerts based on the second subset of
disruption alerts failing to meet a second threshold; and
determine a third disruption classification for a third
subset of disruption alerts, wherein the third subset of
disruption alerts fail to meet the first threshold and
exceed the second threshold:
wherein the plurality of disruption alerts comprises the
first subset of disruption alerts, the second subset of
disruption alerts, and the third subset of disruption
alerts.

18. The non-transitory computer readable storage media
of claim 15, wherein the processor-executable instructions
to determine the disruption classification for each of the
plurality of disruption alerts cause the one or more proces-
sors to further execute processor-executable instructions
stored in the computer readable storage media to:
determine an unknown disruption classification for a
subset of disruption alerts based on the probability
grades for the one or more disruption alerts in the
subset of disruption alerts, wherein the plurality of
disruption alerts comprises the subset of disruption
alerts; and the; and
receive, from a plurality of machine learning (ML) mod-
els, a plurality of iteration probability grades for the
subset of disruption alerts, wherein each ML model of
the plurality of ML model generates a respective itera-
tion probability grade based on the subset of disruption
alerts.

19. The non-transitory computer readable storage media
of claim 15, wherein the processor-executable instructions,
cause the one or more processors to further execute proces-
sor-executable instructions stored in the computer readable
storage media to:
train a machine learning (ML) model on a training dataset
based on historical disruption alerts, wherein the train-
ing dataset comprises:
a plurality of disruption alert features; and
a plurality of alert responses;
test the ML model on an inference dataset, wherein the
inference dataset is different from the training dataset;
and
determine a threshold range for the disruption classifica-
tion based on testing on the inference dataset.

20. The non-transitory computer readable storage media
of claim 15, wherein the processor-executable instructions to determine the disruptor SNR for the one or more disruptors based on the disruption classification of the one or more disruption alerts cause the one or more processors to further execute processor-executable instructions stored in the computer readable storage media to:

determine a disruptor signal-to-noise ratio (SNR) estimation range for the one or more disruptors, wherein the disruptor SNR estimation range comprises a disruptor SNR lower bound and a disruptor SNR upper bound; and generate a final verdict for each of the one or more disruptors based on the SNR estimation range.

<div align="center">* * * * *</div>